(12) United States Patent
Doerksen et al.

(10) Patent No.: US 9,908,580 B2
(45) Date of Patent: Mar. 6, 2018

(54) VEHICLE RIDER DETECTION USING STRAIN GAUGES

(71) Applicant: Future Motion, Inc., Santa Cruz, CA (US)

(72) Inventors: Kyle Jonathan Doerksen, Santa Cruz, CA (US); Daniel Wood, Camas, WA (US)

(73) Assignee: Future Motion, Inc., Santa Cruz, CA (US)

( * ) Notice: Subject to any disclaimer, the term of this patent is extended or adjusted under 35 U.S.C. 154(b) by 0 days.

(21) Appl. No.: 15/612,321

(22) Filed: Jun. 2, 2017

(65) Prior Publication Data

US 2017/0349230 A1   Dec. 7, 2017

Related U.S. Application Data

(60) Provisional application No. 62/344,911, filed on Jun. 2, 2016.

(51) Int. Cl.
| | |
|---|---|
| *A63C 17/12* | (2006.01) |
| *B62K 11/00* | (2006.01) |
| *A63C 17/26* | (2006.01) |
| *A63C 17/01* | (2006.01) |
| *B60L 15/20* | (2006.01) |

(52) U.S. Cl.
CPC .......... *B62K 11/007* (2016.11); *A63C 17/014* (2013.01); *A63C 17/12* (2013.01); *A63C 17/26* (2013.01); *B60L 15/20* (2013.01); *B60L 2200/14* (2013.01); *B60L 2200/16* (2013.01); *B60L 2200/24* (2013.01);

(Continued)

(58) Field of Classification Search
CPC ............... B62K 11/007; B60L 2200/14; B60L 2200/16; B60L 2250/22; A63C 17/014; A63C 17/08; A63C 17/12
See application file for complete search history.

(56) References Cited

U.S. PATENT DOCUMENTS

| | | | |
|---|---|---|---|
| 1,585,258 A | 5/1926 | Moore | |
| 4,023,864 A * | 5/1977 | Lang ................ | B60G 17/01925 188/112 A |

(Continued)

FOREIGN PATENT DOCUMENTS

| | | |
|---|---|---|
| TW | 450823 B | 8/2001 |
| WO | 2009071879 A9 | 6/2009 |

OTHER PUBLICATIONS

Ben Smither, Balancing Scooter / Skateboard:, video, retrieved Sep. 22, 2016 from https://www.youtube.com/watch?v=HGbbag9dklU, uploaded to YouTube on Mar. 4, 2007.

(Continued)

*Primary Examiner* — Frank B Vanaman
(74) *Attorney, Agent, or Firm* — Kolisch Hartwell, P.C.

(57) ABSTRACT

An electric vehicle may include a board having two deck portions each configured to receive a foot of a rider, and a wheel assembly disposed between the deck portions. A motor assembly may drive the wheel assembly in response to board orientation and rider presence information. A rider detection mechanism may include one or more strain gauges, and may be configured to detect rider presence and rider weight information. A responsiveness of the motor may be automatically adjusted based on the rider weight information.

20 Claims, 11 Drawing Sheets

(52) U.S. Cl.
CPC ....... *B60L 2220/46* (2013.01); *B60L 2240/42* (2013.01); *B60L 2250/22* (2013.01)

(56) References Cited

U.S. PATENT DOCUMENTS

| | | | |
|---|---|---|---|
| 4,106,786 A * | 8/1978 | Talbott | A63C 17/01 |
| | | | 280/205 |
| 4,109,741 A | 8/1978 | Gabriel | |
| 4,795,181 A | 1/1989 | Armstrong | |
| 4,997,196 A | 3/1991 | Wood | |
| 5,119,277 A | 6/1992 | Copley et al. | |
| 5,119,279 A | 6/1992 | Makowsky | |
| 5,132,883 A | 7/1992 | La Lumandier | |
| 5,487,441 A | 1/1996 | Endo et al. | |
| 5,513,080 A | 4/1996 | Magle et al. | |
| 5,794,730 A | 8/1998 | Kamen | |
| 6,050,357 A | 4/2000 | Staelin et al. | |
| 6,223,104 B1 | 4/2001 | Kamen et al. | |
| 6,242,701 B1 * | 6/2001 | Breed | B60N 2/002 |
| | | | 177/144 |
| 6,288,505 B1 | 9/2001 | Heinzmann et al. | |
| 6,332,103 B1 | 12/2001 | Steenson, Jr. et al. | |
| 6,408,240 B1 | 6/2002 | Morrell et al. | |
| 6,536,788 B1 | 3/2003 | Kuncz et al. | |
| 6,538,411 B1 | 3/2003 | Field et al. | |
| 6,553,271 B1 | 4/2003 | Morrell | |
| 6,561,294 B1 | 5/2003 | Kamen et al. | |
| 6,779,621 B2 | 8/2004 | Kamen et al. | |
| 6,789,640 B1 | 9/2004 | Arling et al. | |
| 6,827,163 B2 | 12/2004 | Amsbury et al. | |
| 6,874,591 B2 | 4/2005 | Morrell et al. | |
| 6,965,206 B2 | 11/2005 | Kamen et al. | |
| 6,992,452 B1 | 1/2006 | Sachs et al. | |
| 7,023,330 B2 | 4/2006 | Kamen et al. | |
| 7,053,289 B2 | 5/2006 | Iwai et al. | |
| 7,090,040 B2 | 8/2006 | Kamen et al. | |
| 7,091,724 B2 | 8/2006 | Heinzmann et al. | |
| 7,130,702 B2 | 10/2006 | Morrell | |
| 7,138,774 B2 | 11/2006 | Negoro et al. | |
| 7,157,875 B2 | 1/2007 | Kamen et al. | |
| 7,172,044 B2 | 2/2007 | Bouvet | |
| 7,198,280 B2 | 4/2007 | Hara | |
| 7,263,453 B1 | 8/2007 | Gansler et al. | |
| D551,592 S | 9/2007 | Chang et al. | |
| 7,424,927 B2 | 9/2008 | Hiramatsu | |
| 7,467,681 B2 | 12/2008 | Hiramatsu | |
| 7,479,097 B2 | 1/2009 | Rosborough et al. | |
| 7,740,099 B2 | 6/2010 | Field et al. | |
| 7,757,794 B2 | 7/2010 | Heinzmann et al. | |
| 7,789,174 B2 | 9/2010 | Kamen et al. | |
| 7,811,217 B2 | 10/2010 | Odien | |
| 7,857,088 B2 | 12/2010 | Field et al. | |
| 7,900,725 B2 | 3/2011 | Heinzmann et al. | |
| 7,962,256 B2 | 6/2011 | Stevens et al. | |
| 7,963,352 B2 | 6/2011 | Alexander | |
| 7,979,179 B2 | 7/2011 | Gansler | |
| 8,052,293 B2 | 11/2011 | Hurwitz | |
| 8,083,313 B2 | 12/2011 | Karppinen et al. | |
| 8,146,696 B2 | 4/2012 | Kaufman | |
| 8,170,780 B2 | 5/2012 | Field et al. | |
| 8,467,941 B2 | 6/2013 | Field et al. | |
| 8,490,723 B2 | 7/2013 | Heinzmann et al. | |
| 8,562,386 B2 | 10/2013 | Carlson et al. | |
| 8,682,487 B2 | 3/2014 | Kurth et al. | |
| 9,097,598 B2 | 8/2015 | Grassi | |
| 9,101,817 B2 | 8/2015 | Doerksen | |
| D746,928 S | 1/2016 | Doerksen | |
| 9,400,505 B2 | 7/2016 | Doerksen | |
| D768,252 S | 10/2016 | Bigler | |
| D769,997 S | 10/2016 | Doerksen | |
| 2002/0074176 A1 | 6/2002 | Justus et al. | |
| 2005/0121238 A1 | 6/2005 | Ishii | |
| 2005/0241864 A1 | 11/2005 | Hiramatsu | |
| 2006/0038520 A1 * | 2/2006 | Negoro | A63C 17/12 |
| | | | 318/466 |
| 2006/0049595 A1 | 3/2006 | Crigler et al. | |
| 2006/0170174 A1 * | 8/2006 | Hiramatsu | A63C 17/0033 |
| | | | 280/87.041 |
| 2006/0213711 A1 * | 9/2006 | Hara | A63C 17/0033 |
| | | | 180/181 |
| 2006/0260862 A1 * | 11/2006 | Nishikawa | B62K 17/00 |
| | | | 180/315 |
| 2007/0194558 A1 | 8/2007 | Stone et al. | |
| 2007/0254789 A1 | 11/2007 | Odien | |
| 2008/0294094 A1 | 11/2008 | Mhatre et al. | |
| 2009/0178877 A1 | 7/2009 | Keller et al. | |
| 2011/0071711 A1 | 3/2011 | Sharp et al. | |
| 2011/0309772 A1 | 12/2011 | Forgey | |
| 2012/0232734 A1 | 9/2012 | Pelletier | |
| 2013/0081891 A1 | 4/2013 | Ulmen et al. | |
| 2013/0175943 A1 | 7/2013 | Tackett | |
| 2013/0206493 A1 | 8/2013 | Larson | |
| 2014/0172262 A1 | 6/2014 | Andoh | |
| 2015/0107922 A1 | 4/2015 | Bigler | |
| 2015/0323935 A1 | 11/2015 | Doerksen | |
| 2017/0088212 A1 | 3/2017 | Edney | |

OTHER PUBLICATIONS www.electricunicycle.com, "Leviskate self-balancing one-wheel skateboard", video, retrieved Sep. 22, 2016 from https://www.youtube.com/watch?v=462Jj1xSSqc, uploaded to YouTube on Aug. 5, 2007.
John Xenon, "One wheel self balancing skateboard Ver2 Jan. 2009. #2", video, retrieved Sep. 22, 2016 from https://www.youtube.com/watch?v=8RPFNUsuW78, uploaded to YouTube on Jan. 3, 2009.
Rodger Cleye, "Leviskate (Balancing Skateboard) in Operation", video, retrieved Sep. 22, 2016 from https://www.youtube.com/watch?v=eN2J8m_E0go, uploaded to YouTube on Apr. 18, 2013.
NITTO DENKO Temish® Venting System S-NTF Series Products Data Sheet, circa before Nov. 5, 2014.
Jan. 27, 2016, International Search Report of the International Searching Authority from the U.S. Receiving Office, in PCT Patent Application PCT/US2015/059332, which is an international application of Applicant Future Motion, Inc. which shares the same priority as this U.S. application.
Jan. 27, 2016, Written Opinion of the International Searching Authority from the U.S. Receiving Office, in PCT Patent Application PCT/US2015/059332, which is an international application of Applicant Future Motion, Inc. which shares the same priority as this U.S. application.
Nov. 17, 2016, Office action from the U.S. Patent and Trademark Office, in U.S. Appl. No. 15/275,067, which shares the same priority as this U.S. application.
"FRS 101", Sensitronics LLC. "The Dynamics of Touch".
"Vent Filter TEMISH® CAPSEAL", Nitto.
Aug. 21, 2017, International Search Report of the International Searching Authority from the U.S. Receiving Office, in PCT/US2017/035667, which is the international application to this U.S. application.
Aug. 21, 2017, Written Opinion of the International Searching Authority from the U.S. Receiving Office, in PCT/US2017/035667, which is the international application to this U.S. application.
Jan. 29, 2016, Office action from the U.S. Patent and Trademark Office, in U.S. Appl. No. 14/934,024, which shares the same priority as this U.S. application.

* cited by examiner

150 # VEHICLE RIDER DETECTION USING STRAIN GAUGES

CROSS-REFERENCES

This application claims the benefit under 35 U.S.C. § 119(e) of the priority of U.S. Provisional Patent Application Ser. No. 62/344,911, filed Jun. 2, 2016, the entirety of which is hereby incorporated by reference for all purposes.

The following related applications and materials are incorporated herein, in their entireties, for all purposes: U.S. patent application Ser. No. 14/934,024; U.S. Pat. No. 9,101,817.

FIELD

The present disclosure is generally directed to self-stabilizing electric vehicles. More specifically, the disclosure is directed to rider detection systems and methods for such vehicles.

SUMMARY

The present disclosure provides systems and methods for determining and/or assessing rider presence on an electric vehicle, such as a self-balancing skateboard, as well as related systems and methods.

Features, functions, and advantages may be achieved independently in various embodiments of the present disclosure, or may be combined in yet other embodiments, further details of which can be seen with reference to the following description and drawings.

DESCRIPTION

The present disclosure provides systems and methods for determining and/or assessing rider presence on an electric vehicle, such as a self-balancing skateboard. Various aspects and examples of an electric vehicle having a rider detection system including one or more strain gauges, as well as related methods, are described below and illustrated in the associated drawings. Unless otherwise specified, the electric vehicle and/or its various components may, but are not required to, contain at least one of the structure, components, functionality, and/or variations described, illustrated, and/or incorporated herein. Furthermore, the process steps, structures, components, functionalities, and/or variations described, illustrated, and/or incorporated herein in connection with the present teachings may, but are not required to, be included in other similar systems or methods. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Coupled" means connected, either permanently or releasably, whether directly or indirectly through intervening components, and is not necessarily limited to physical connection(s).

"Substantially" means to be essentially conforming to the particular dimension, range, shape, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Overview

Figure 1:
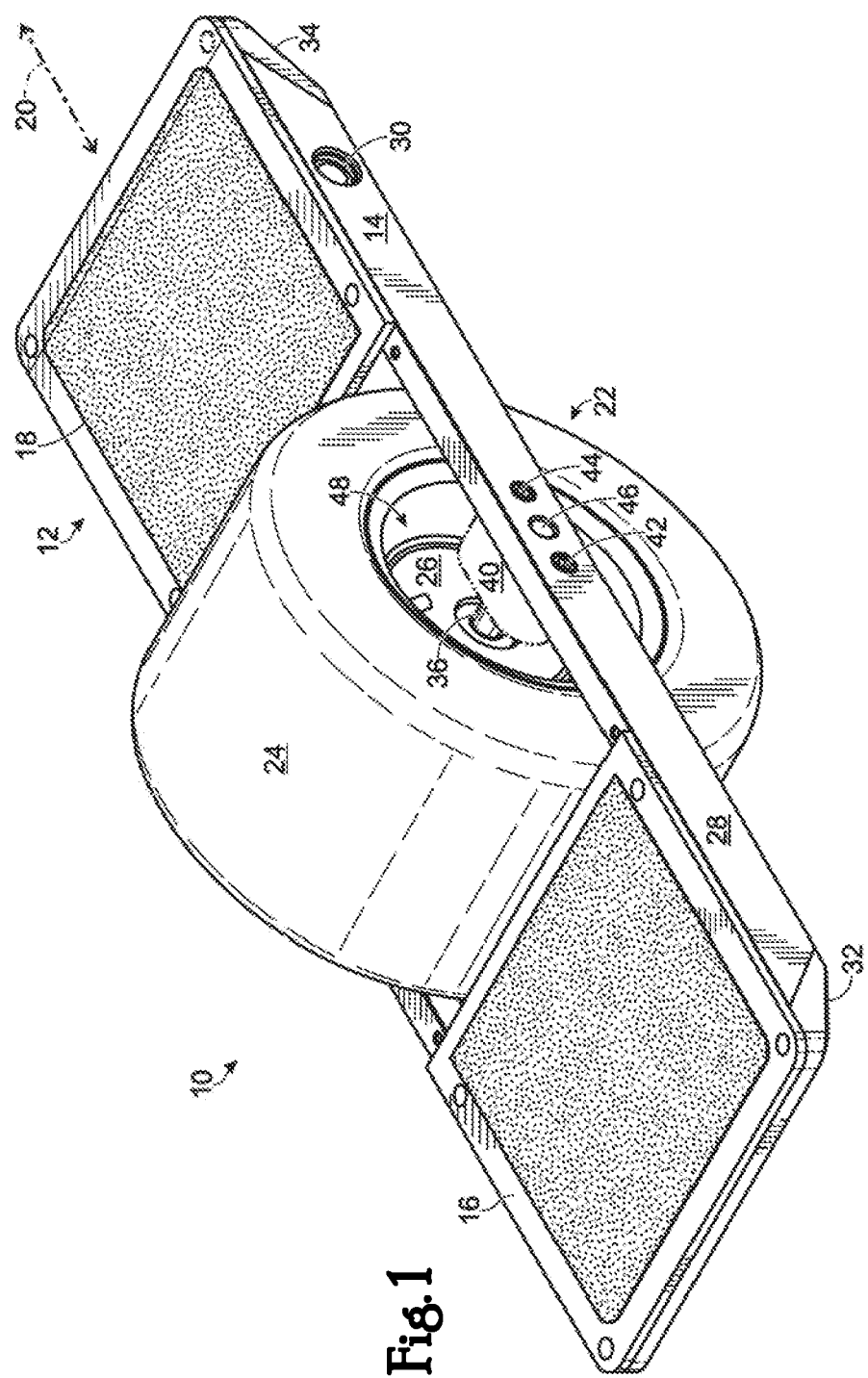
FIG. 1 is an isometric view of an illustrative one-wheeled electric vehicle.

In general, and as shown in FIG. 1, an illustrative electric vehicle 10 may be suitable for use with a strain gauge rider detection system in accordance with aspects of the present disclosure.

Vehicle 10 is a one-wheeled, self-stabilizing skateboard substantially similar to the electric vehicles described in U.S. Pat. No. 9,101,817 (the '817 patent), the entirety of which is hereby incorporated herein for all purposes. Accordingly, vehicle 10 includes a board 12 having a frame 14 supporting a first deck portion 16 and a second deck portion 18. Each deck portion 16, 18 is configured to receive a left or right foot of a rider oriented generally perpendicular to a direction of travel of the board (see FIG. 2), said direction of travel generally indicated at 20.

Vehicle 10 also includes a wheel assembly 22. Wheel assembly 22 includes a rotatable ground-contacting element 24 (e.g., a tire, wheel, or continuous track) disposed between and extending above the first and second deck portions 16, 18, and a hub motor 26 configured to rotate ground-contacting element 24 to propel the vehicle. As shown in FIG. 1, vehicle 10 may include exactly one ground-contacting element.

Frame 14 may include any suitable structure configured to rigidly support the deck portions and to be coupled to an axle of the wheel assembly, such that the weight of a rider may be supported on tiltable board 12 having a fulcrum at the wheel assembly axle. Frame 14 may include one or more frame members 28, on which deck portions 16 and 18 may be mounted, and which may further support additional elements and features of the vehicle, such as a charging port 30, and end bumpers 32, 34, as well as lighting assemblies, battery and electrical systems, electronics, controllers, and the like (see, e.g., FIG. 3 and corresponding description).

Deck portions 16 and 18 may include any suitable structures configured to support the feet of a rider, such as non-skid surfaces, as well as vehicle-control features, such as a rider detection system. In some examples, a rider detection system includes a strain gauge rider detection system according to the present teachings—see below. Illustrative deck portions, including other suitable rider detection systems, are described in the '817 patent, as well as in U.S. patent application Ser. No. 14/934,024, the entirety of which is hereby included herein by reference for all purposes.

A shaft 36 of an axle portion of hub motor 26 is coupled to frame 14, as shown in FIG. 1. For example, the shaft may be directly attached to frame 14, or may be coupled to the frame through a connection or mounting block 40 (also referred to as an axle mount). Shaft 36 may be bolted or otherwise affixed to mounting block 40, which in turn may be bolted or affixed to frame 14 (e.g., by bolts 42, 44). A through hole 46 may be provided in frame 14 for access to the connector of shaft 36 to block 40.

Figure 2:
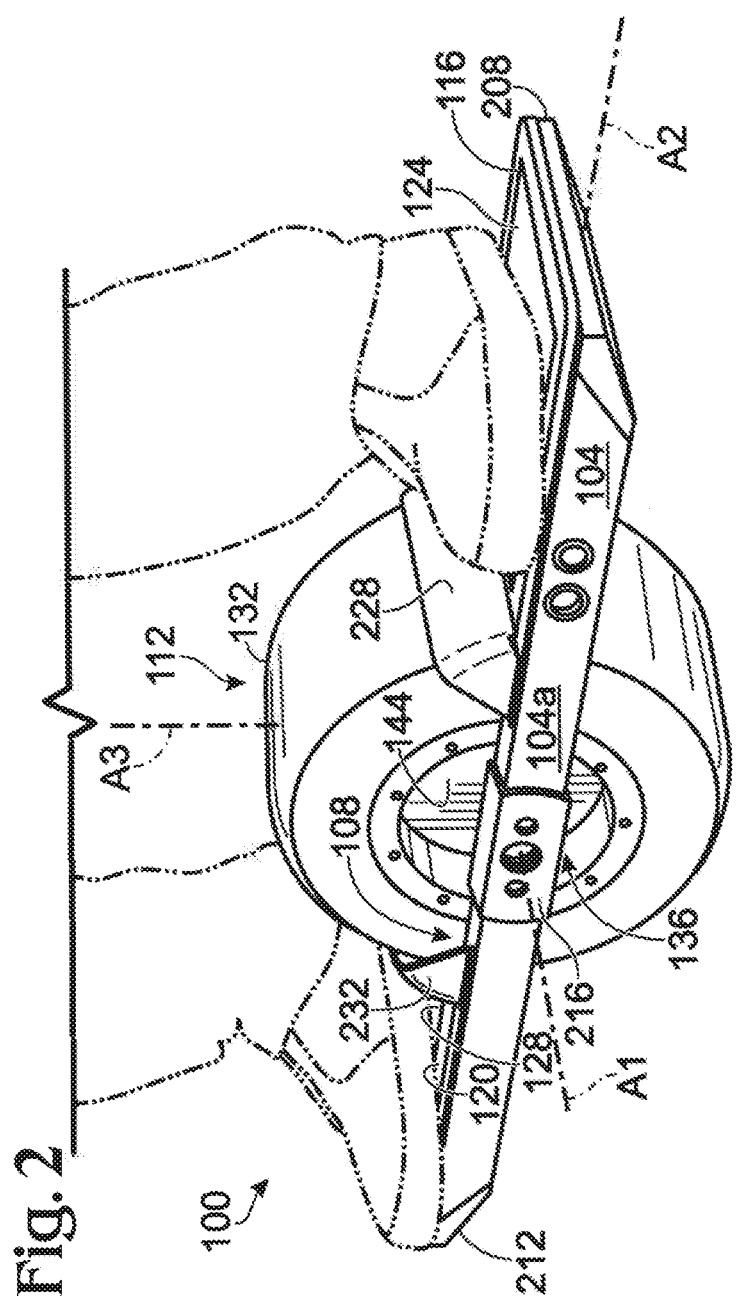
FIG. 2 is an isometric view of another illustrative one-wheeled electric vehicle indicating a rider position thereon.
Figure 3:
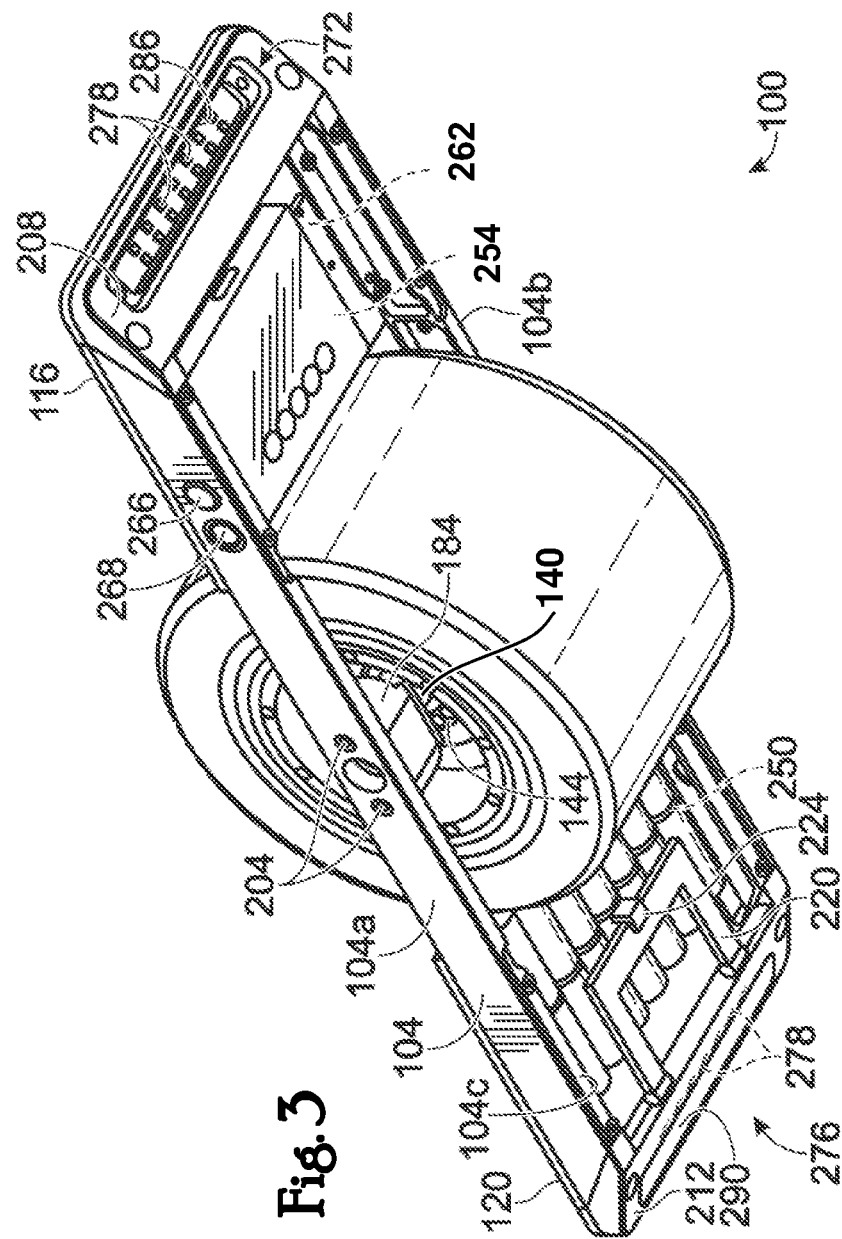
FIG. 3 is an isometric view of the underside of the vehicle of FIG. 2.

FIGS. 2-3 depict another example of a self-balancing electric vehicle substantially similar to vehicle 10, indicated at 100. Vehicle 100 may include a board (or foot deck, or frame, or platform) 104 having an opening 108 for receiving a wheel assembly 112 between first and second deck portions (or footpads) 116, 120. First and second deck portions 116, 120 may be of the same physical piece, or may be separate pieces. First and second deck portions 116, 120 may be included in board 104. First and second deck portions 116, 120 may each be configured to support a rider's foot. First and second deck portions 116, 120 may each be configured to receive a left or a right foot of the rider.

Frame 104 may define a plane. First deck portion 116 may be mounted to frame 104 and configured to support a first foot of the rider. Second deck portion 120 may be mounted to frame 104 and configured to support a second foot of the rider.

Wheel assembly 112 may be disposed between first and second deck portions 116, 120. First and second deck portions 116, 120 may be located on opposite sides of wheel assembly 112 with board 104 being dimensioned to approximate a skateboard. In other embodiments, the board may approximate a longboard skateboard, snowboard, surfboard, or may be otherwise desirably dimensioned. Deck portions 116, 120 of board 104 may be covered with non-slip material portions 124, 128 (e.g., 'grip tape') to aid in rider control.

Wheel assembly 112 may include a ground-contacting element (e.g., a tire, wheel, or continuous track) 132. As shown, vehicle 100 includes exactly one ground-contacting element 132, and the exactly one ground-contacting element is disposed between first and second deck portions 116, 120. Ground-contacting element 132 may be mounted to a motor assembly 136. Motor assembly 136 may be mounted to board 104. Motor assembly 136 may include an axle 140 (see FIG. 2), which may be coupled to board 104 by one or more axle mounts and one or more fasteners, such as a plurality of bolts (see FIGS. 2 and 4). Motor assembly 136 may be configured to rotate ground-contacting element 132 around (or about) axle 140 to propel vehicle 100. For example, motor assembly 136 may include a motor, such as a hub motor 144, configured to rotate ground-contacting element 132 about axle 140 to propel vehicle 100 along the ground. The motor may be an electric motor.

Vehicle 100 may have a pitch axis $A1$, a roll axis $A2$, and a yaw axis $A3$. Pitch axis $A1$ may be an axis about which tire 132 is rotated by motor assembly 136. For example, pitch axis $A1$ may pass through axle 140 (e.g., pitch axis $A1$ may be parallel to and aligned with an elongate direction of axle 140). Roll axis $A2$ may be perpendicular to pitch axis $A1$, and may substantially extend in a direction in which vehicle 100 may be propelled by motor assembly 136. For example, roll axis $A2$ may extend in an elongate direction of board 104. Yaw axis $A3$ may be perpendicular to pitch axis $A1$ and to roll axis $A2$. For example, yaw axis $A3$ may be normal to a plane defined by deck portions 116, 120.

Wheel 132 may be mounted to frame 104 between deck portions 116, 120. Wheel 132 may extend above and below the plane defined by frame 104. Wheel 132 may be configured to rotate about an axis (e.g., pitch axis $A1$) lying in the plane. In addition, roll axis $A2$ may lie in the plane defined by frame 104. In some embodiments, the pitch and roll axes may define the plane.

Tire 132 may be wide enough in a heel-toe direction (e.g., in a direction parallel to pitch axis $A1$), so that the rider can balance themselves in the heel-toe direction using their own balance. Tire 132 may be tubeless, or may be used with an inner tube. Tire 132 may be a non-pneumatic tire. For example, tire 132 may be "airless", solid, and/or made of foam. Tire 132 may have a profile such that the rider can lean vehicle 100 over an edge of tire 132 (and/or pivot the board about roll axis $A2$ and/or yaw axis $A3$) through heel and/or toe pressure to corner vehicle 100.

Hub motor 144 may be mounted within tire (or wheel) 132 and may be internally geared or may be direct-drive. The use of a hub motor may eliminate chains and belts, and may enable a form factor that considerably improves maneuverability, weight distribution, and aesthetics. Mounting tire 132 onto hub motor 144 may be accomplished by either a split-rim design that may use hub adapters, which may be bolted on to hub motor 144, or by casting a housing of the hub motor such that it provides mounting flanges for a tire bead directly on the housing of the hub motor.

With continuing reference to FIGS. 2-3, a first skid pad 208 may be integrated into (or connected to) a first end of board 104 proximal first deck portion 116, and a second skid pad 212 may be integrated into (or connected to) a second end of board 104 proximal second deck portion 120. Skid pads 208, 212 may be replaceable and/or selectively removable. For example, the skid pads may include replaceable polymer parts or components. In some embodiments, the skid pads may be configured to allow the rider to bring vehicle 100 to a stop in an angled orientation (e.g., by setting one end of the board against the ground after the rider removes their foot from a rider detection device or switch, which is described below in further detail). The respective skid pad may be worn by abrasion with the surface of the ground as that end of the board is set against (or brought into contact with) the ground.

Vehicle 100 may include one or more side-skid pads configured to protect the paint or other finish on board 104, and/or otherwise protect vehicle 100 if, for example, vehicle 100 is flipped on its side and/or slides along the ground on its side. For example, the one or more side-skid pads may be removably connected to one or more opposing longitudinal sides of the board (e.g., extending substantially parallel to the roll axis). FIG. 2 shows a first side-skid pad 216 connected to a first longitudinal side 104a of board 104. In FIG. 3, side-skid pad 216 has been removed from first longitudinal side 104a. A second side-skid pad (not shown) may be similarly removably connected to a second longitudinal side 104b (see FIG. 3) of board 104 opposite first longitudinal side 104a. The side-skid pads may be incorporated into the electric vehicle as one or more removable parts or components, and/or may be or include replaceable polymer parts or components.

A removable connection of the skid pads and/or the side-skid pads to the board may enable the rider (or other user) to selectively remove one or more of these pads that become worn with abrasion, and/or replace the worn pad(s) with one or more replacement pads.

As shown in FIG. 3, vehicle 100 may include a handle 220. Handle 220 may be disposed on an underside 104c of board 104. Handle 220 may be integrated into a housing or enclosure of one or more of the electrical components.

In some embodiments, handle 220 may be operable between IN and OUT positions. For example, handle 220 may be pivotally connected to board 104, with the IN position corresponding to handle 220 substantially flush with underside 104c of board 104, and the OUT position corresponding to handle 220 pivoted (or folded) away from underside 104 such that handle 220 projects away from deck portion 120.

Vehicle 100 may include any suitable mechanism, device, or structure for releasing handle 220 from the IN position. For example, vehicle 100 may include a locking mechanism 224 that is configured to operate handle 220 between a LOCKED state corresponding to handle 220 being prevented from moving from the IN position to the OUT position, and an UNLOCKED state corresponding to handle 220 being allowed to move from the IN position to the OUT position. In some embodiments, the rider may press locking mechanism 224 to operate the handle from the LOCK state to the UNLOCKED state. The rider may manually move handle 220 from the IN position to the OUT position. The rider may grasp handle 220, lift vehicle 100 off of the ground, and carry vehicle 100 from one location to another.

In some embodiments, handle 220 may include a biasing mechanism, such as a spring, that automatically forces handle 220 to the OUT position when operated to the UNLOCKED state. In some embodiments, locking mechanism 224 may be configured to selectively lock handle 220 in the OUT position.

Vehicle 100 may include any suitable apparatus, device, mechanism, and/or structure for preventing water, dirt, or other road debris from being transferred by the ground-contacting element to the rider. For example, as shown in FIG. 2, vehicle 100 may include first and second partial fender portions 228, 232. Portion 228 is shown coupled to first deck portion 116, and portion 232 is shown coupled to second deck portion 120. Portion 228 may prevent debris from being transferred from tire 132 to a portion of the rider positioned on or adjacent deck portion 116, such as when tire 132 is rotated about pitch axis A1 in a counter-clockwise direction. Portion 232 may prevent debris from being transferred from tire 132 to a portion of the rider positioned on or adjacent deck portion 120, such as when tire 132 is rotated about pitch axis A1 in a clockwise direction.

Additionally and/or alternatively, vehicle 100 may include a full fender (not shown). A full fender may be configured to prevent a transfer of debris from the ground-contacting element to the rider. A full fender and/or fender portions 228, 232 may be attached to at least one of deck portions 116, 120 and configured to prevent water traversed by wheel 132 from splashing onto the rider. Fender 240 may be attached to both of deck portions 116, 120, and may substantially entirely separate wheel 132 from the rider.

Fenders may include a resilient fender. For example, fenders may include (or be) a sheet of substantially flexible or resilient material, such as plastic. A first side of the resilient material may be coupled to deck portion 116 (or board 104 proximate deck portion 116), and a second side of the resilient material may be coupled to deck portion 120 (or board 104 proximate deck portion 120).

As indicated in FIG. 3, the one or more electrical components of vehicle 100 may include a power supply 250, a motor controller 254, a rider detection device 262, a power switch 266, and a charge plug 268. Power supply 250 may include one or more batteries which may be re-chargeable, such as one or more lithium batteries that are relatively light in weight and have a relatively high power density. For example, power supply 250 may include one or more lithium iron phosphate batteries, one or more lithium polymer batteries, one or more lithium cobalt batteries, one or more lithium manganese batteries, or a combination thereof. For example, power supply 250 may include sixteen (16) A123 lithium iron phosphate batteries (e.g., size 26650). The batteries of power supply 250 may be arranged in a 16S1P configuration. A microcontroller 269 and/or one or more sensors (or at least one sensor) 270 may be included in or connected to motor controller 254 (see FIG. 5). At least one of sensors 270 may be configured to measure orientation information (or an orientation) of board 104. For example, sensors 270 may be configured to sense movement of board 104 about and/or along the pitch, roll, and/or yaw axes. The motor may be configured to cause rotation of wheel 132 based on the orientation of board 104. In particularly, motor controller 254 may be configured to receive orientation information measured by the at least one sensor of sensors 270 and to cause motor assembly 254 to propel the electric vehicle based on the orientation information. For example, motor controller 254 may be configured to drive hub motor 144 based on received sensed movement of board 104 from sensors 270 via microcontroller 269 to propel and/or actively balance vehicle 100.

One or more of the electrical components may be integrated into board 104. For example, board 104 may include a first environmental enclosure that may house power supply 250, and a second environmental enclosure that may house motor controller 254, and rider detection device 262. The environmental enclosures may protect the one or more electrical components from being damaged, such as by water ingress.

Vehicle 100 may include one or more light assemblies, such as one or more headlight and/or taillight assemblies. For example, a first headlight/taillight assembly (or first light assembly) 272 may be disposed on or at (and/or connected to) a first end portion of board 104 (e.g., at a distal end portion of first deck portion 116), and a second headlight/taillight assembly 276 may be disposed on or at (and/or connected to) a second end portion of board 104 (e.g., at a distal end portion of second deck portion 120). The second end portion of board 104 may be opposite the first end portion.

Headlight/taillight assemblies 272, 276 may be configured to reversibly light vehicle 100. For example, assemblies 272, 276 may indicate the direction that vehicle 100 is moving by changing color. For example, the headlight/taillight assemblies may each include one or more high output red and white LEDs (or other suitable one or more illuminators) 278 configured to receive data from microcontroller 269 (and/or a pitch sensor of sensors 270, such as a 3-axis gyro 280—see FIG. 4) and automatically change color from red to white (or white to red, or a first color to a second color) based on the direction of movement of vehicle 100, with white LEDs (or a first color) shining in the direction of motion and red LEDs (or a second color) shining backward (e.g., opposite the direction of motion). For example, one or more of the headlight/taillight assemblies (e.g., their respective illuminators) may be connected to microcontroller 269 via an LED driver 282 (see FIG. 4), which may be included in or connected to motor controller 254. In some embodiments, the illuminators may include RGB/RGBW LEDs.

Illuminators 278 may be located in and/or protected by skid pads 208, 212, as shown in FIG. 3. For example, skid pads 208, 212 may include respective apertures 286, 290. Illuminators 278 may be disposed in and shine through respective apertures 286, 290. Apertures 286, 290 may be dimensioned to prevent illuminators 278 from contacting the ground. For example, apertures 286, 290 may each have a depth that is greater than a height of illuminators 278. In some embodiments, the illuminators may be separable from the associated skid pad, so that the skid pads may be removed without removing the illuminators.

As shown in FIG. 3, first skid pad 208 and a first illuminator 278 are disposed at a distal end of first deck portion 116, and second skid pad 212 and a second illuminator 278 are disposed at a distal end of second deck portion 120. Each of skid pads may include an aperture (e.g., skid pad 208 may include aperture 286, and skid pad 212 may include aperture 290, as mentioned above) configured to allow light from the corresponding illuminator to shine through while preventing the illuminator from contacting the ground.

A. Illustrative Electrical System

Figure 4:
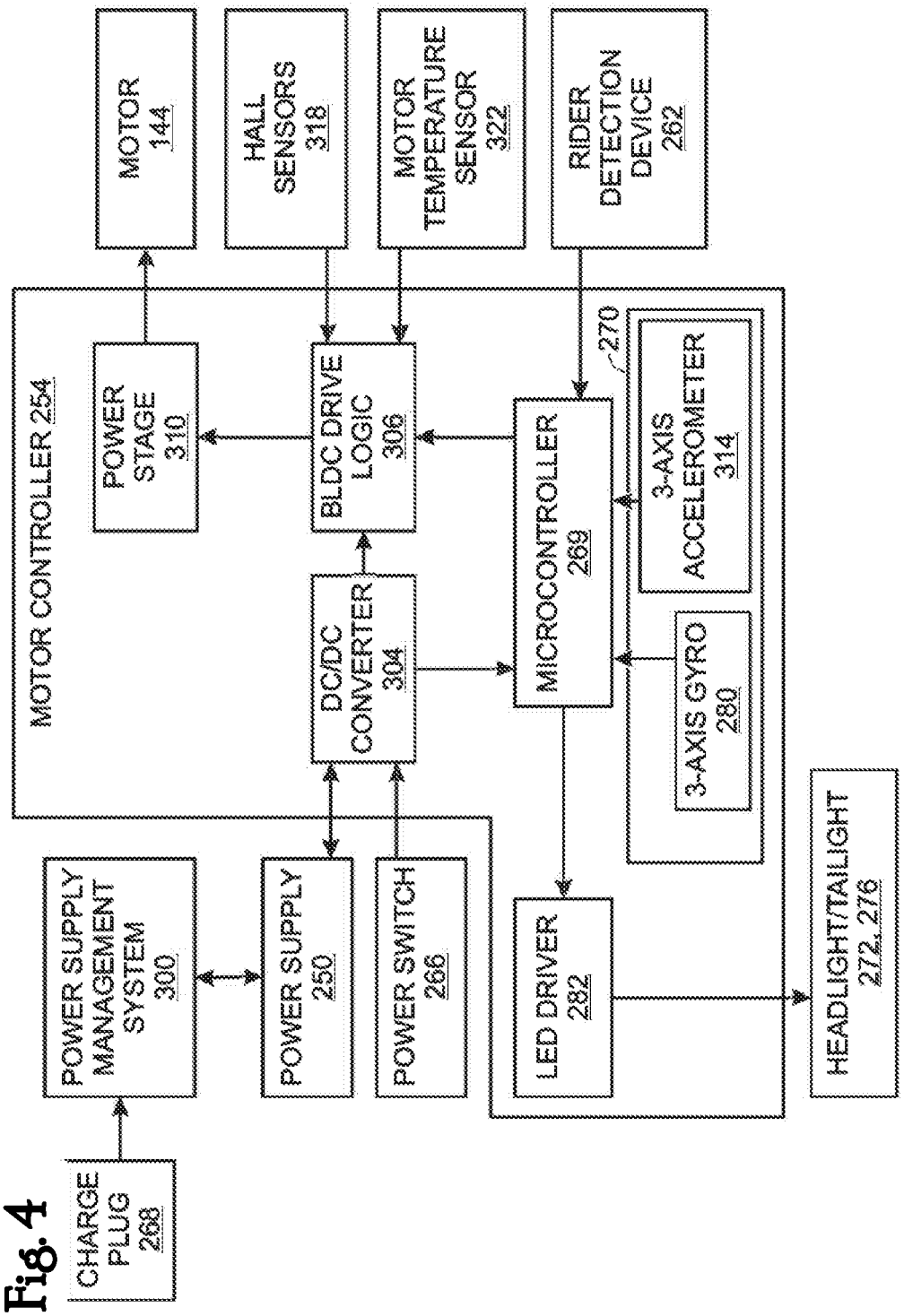
FIG. 4 is a schematic diagram of selected electrical and electronic systems of an illustrative electric vehicle in accordance with aspects of the present disclosure.

FIG. 4 shows a block diagram of selected electrical components of an electric vehicle, e.g., vehicle 10 and/or vehicle 100. The electrical components may include a power supply management system 300, a direct current to direct current (DC/DC) converter 304, a brushless direct current (BLDC) drive logic 306, a power stage 310, a three-axis accelerometer 314, one or more hall sensors 318, and a motor temperature sensor 322. DC/DC converter 304, BLDC drive logic 306, and power stage 310 may be included in and/or connected to motor controller 254. Accelerometer 314 may be included in sensors 270.

Active balancing (or self-stabilization) of the electric vehicle may be achieved through the use of a feedback control loop or mechanism, which may be implemented in the one or more electrical components. The feedback control mechanism may include sensors 270 coupled to (and/or included in) motor controller 254.

Preferably, the feedback control mechanism includes a Proportional-Integral-Derivative (PID) control scheme using one or more gyros (e.g., gyro 280) and one or more accelerometers (e.g., accelerometer 314). Gyro 280 may be configured to measure pivotation (also referred to as tilting or pivoting) of foot deck 16, 18 about the pitch axis. Gyro 280 and accelerometer 314 may be collectively configured to estimate (or measure, or sense) a lean angle of board 12, such as an orientation of the foot deck about the pitch, roll and yaw axes. In some embodiments, the gyro and accelerometer 314 may be collectively configured to sense orientation information sufficient to estimate the lean angle of frame 14 including pivotation about the pitch, roll and yaw axes.

As mentioned above, orientation information of board 12 may be measured (or sensed) by gyro 280 and accelerometer 314. The respective measurements (or sense signals) from gyro 280 and accelerometer 314 may be combined using a complementary or Kalman filter to estimate a lean angle of board 12 (e.g., pivotation of board 12 about the pitch, roll, and/or yaw axes, with pivotation about the pitch axis corresponding to a pitch angle, pivotation about the roll axis corresponding to a roll or heel-toe angle, and pivotation about the yaw axis corresponding to a yaw angle) while filtering out the impacts of bumps, road texture and disturbances due to steering inputs. For example, gyro 280 and accelerometer 314 may be connected to microcontroller 269, which may be configured to correspondingly measure movement of board 12 about and along the pitch, roll, and yaw axes (see FIG. 2). Alternatively, the electronic vehicle may include any suitable sensor and feedback control loop configured to self-stabilize a vehicle, such as a 1-axis gyro configured to measure pivotation of the board about the pitch axis, a 1-axis accelerometer configured to measure a gravity vector, and/or any other suitable feedback control loop, such as a closed-loop transfer function. However, additional accelerometer and gyro axes may allow improved performance and functionality, such as detecting if the board has rolled over on its side or if the rider is making a turn.

The feedback control loop may be configured to drive motor 144 to reduce an angle of board 12 with respect to the ground. For example, if in FIG. 2 the rider was to angle board 12 downward, so that first deck portion 16 was 'lower' than second deck portion 18 (e.g., if the rider pivoted board 12 clockwise about pitch axis A1), then the feedback loop may drive motor 144 to cause clockwise rotation of tire 24 about pitch axis A1, and a counter-clockwise force on board 12.

Thus, motion of the electric vehicle may be achieved by the rider leaning their weight toward their 'front' foot. Similarly, deceleration may be achieved by the rider leaning toward their 'back' foot. Regenerative braking can be used to slow the vehicle. Sustained reverse operation may be achieved by the rider maintaining their lean toward their 'back' foot.

As indicated in FIG. 4, microcontroller 269 may be configured to send a signal to BLDC drive logic 306, which may communicate information relating to the orientation and motion of board 12. BLDC drive logic 306 may then interpret the signal and communicate with power stage 310 to drive motor 144 accordingly. Hall sensors 318 may send a signal to the BLDC drive logic to provide feedback regarding a substantially instantaneous rotational rate of the rotor of motor 144. Motor temperature sensor 322 may be configured to measure a temperature of motor 144 and send this measured temperature to logic 306. Logic 306 may limit an amount of power supplied to motor 144 based on the measured temperature of motor 144 to prevent motor 144 from overheating.

Certain modifications to the PID loop or other suitable feedback control loop may be incorporated to improve performance and safety of the electric vehicle. For example, integral windup may be prevented by limiting a maximum integrator value, and an exponential function may be applied to a pitch error angle (e.g., a measure or estimated pitch angle of board 12).

Alternatively or additionally, some embodiments may include neural network control, fuzzy control, genetic algorithm control, linear quadratic regulator control, state-dependent Riccati equation control or other control algorithms. In some embodiments, absolute or relative encoders may be incorporated to provide feedback on motor position.

As mentioned above, during turning, the pitch angle can be modulated by the heel-toe angle (e.g., pivotation of the board about the roll axis), which may improve performance and prevent a front inside edge of board 12 from touching the ground. In some embodiments, the feedback loop may be configured to increase, decrease, or otherwise modulate the rotational rate of the tire if the board is pivoted about the roll and/or yaw axes. This modulation of the rotational rate of the tire may exert an increased normal force between a portion of the board and the rider, and may provide the rider with a sense of 'carving' when turning, similar to the feel of carving a snowboard through snow or a surfboard through water.

Once the rider has suitably positioned themselves on the board, the control loop may be configured to not activate until the rider moves the board to a predetermined orientation. For example, an algorithm may be incorporated into the feedback control loop, such that the control loop is not active (e.g., does not drive the motor) until the rider uses their weight to bring the board up to an approximately level orientation (e.g., 0 degree pitch angle). Once this predetermined orientation is detected, the feedback control loop may be enabled (or activated) to balance the electric vehicle and to facilitate a transition of the electric vehicle from a stationary mode (or configuration, or state, or orientation) to a moving mode (or configuration, or state, or orientation).

Referring to FIG. 4, the one or more electrical components may be configured to manage power supply 250. For example, power supply management system 300 may be a battery management system configured to protect batteries of power supply 250 from being overcharged, over-discharged, and/or short-circuited. System 300 may monitor battery health, may monitor a state of charge in power supply 250, and/or may increase the safety of the vehicle. Power supply management system 300 may be connected between charge plug 268 and power supply 250. The rider (or other user) may couple a charger to plug 268 and re-charge power supply 250 via system 300.

In operation, power switch 266 may be activated (e.g., by the rider). Activation of switch 266 may send a power-on signal to converter 304. In response to the power-on signal, converter 304 may convert direct current from a first voltage level provided by power supply 250 to one or more other voltage levels. The other voltage levels may be different than the first voltage level. Converter 304 may be connected to the other electrical components via one or more electrical connections to provide these electrical components with suitable voltages.

Converter 304 (or other suitable circuitry) may transmit the power-on signal to microcontroller 269. In response to the power-on signal, microcontroller may initialize sensors 270, and rider detection device 262.

The electric vehicle may include one or more safety mechanisms, such as power switch 266 and/or rider detection device 262 to ensure that the rider is on the board before engaging the feedback control loop. In some embodiments, rider detection device 262 may be configured to determine if the rider's feet are disposed on the foot deck, and to send a signal causing motor 144 to enter an active state when the rider's feet are determined to be disposed on foot deck portions 16, 18.

Rider detection device 262 may include any suitable mechanism, structure, or apparatus for determining whether the rider is on the electric vehicle. For example, device 262 may include one or more mechanical buttons, one or more capacitive sensors, one or more inductive sensors, one or more optical switches, one or more force resistive sensors, and/or one or more strain gauges. The one or more mechanisms may be located on or under either or both of first and second deck portions 16, 18 (see FIG. 1).

The one or more rider detection mechanisms may be pressed, manipulated, or otherwise affected directly (e.g., if on the deck portions), or indirectly (e.g., if under the deck portions), to sense whether the rider is on board 12. In examples including one or more capacitive sensors and/or one or more inductive sensors, the sensors may be located on or near a surface of either or both of the deck portions, and may correspondingly detect whether the rider is on the board via a change in capacitance or a change in inductance. Similarly, in examples including one or more optical switches, the switches may be located on or near the surface of either or both of the deck portions. The one or more optical switches may detect whether the rider is on the board based on an optical signal. In examples having one or more strain gauges, the strain gauges may be configured to measure board or axle flex imparted by the rider's feet to detect whether the rider is on the board. In some embodiments, device 262 may include a hand-held "dead-man" switch. Various embodiments and aspects relating to device 262 are discussed further below, e.g., in the section titled Illustrative Rider Detection Devices and Systems.

If device 262 detects that the rider is suitably positioned on the electric vehicle, then device 262 may send a rider-present signal to microcontroller 269. The rider-present signal may be the signal causing motor 144 to enter the active state. In response to the rider-present signal (and/or the board being moved to the level orientation), microcontroller 269 may activate the feedback control loop for driving motor 144. For example, in response to the rider-present signal, microcontroller 269 may send board orientation information (or measurement data) from sensors 270 to logic 306 for powering motor 144 via power stage 310.

In some embodiments, if device 262 detects that the rider is no longer suitably positioned or present on the electric vehicle, device 262 may send a rider-not-present signal to microcontroller 269. In response to the rider-not-present signal, circuitry of vehicle 100 (e.g., microcontroller 269, logic 306, and/or power stage 310) may be configured to reduce a rotational rate of the rotor relative to the stator to bring vehicle 100 to a stop. For example, the electric coils of the rotor may be selectively powered to reduce the rotational rate of the rotor. In some embodiments, in response to the rider-not-present signal, the circuitry may be configured to energize the electric coils with a relatively strong and/or substantially continuously constant voltage, to lock the rotor relative to the stator, to prevent the rotor from rotating relative to the stator, and/or to bring the rotor to a sudden stop.

In some embodiments, the vehicle may be configured to actively drive motor 144 even though the rider may not be present on the vehicle (e.g., temporarily), which may allow the rider to perform various tricks. For example, device 262 may be configured to delay sending the rider-not-present signal to the microcontroller for a predetermined duration of time, and/or the microcontroller may be configured to delay sending the signal to logic 306 to cut power to the motor for a predetermined duration of time.

The electric vehicle may include other safety mechanisms, such as a buzzer mechanism. The buzzer mechanism may be configured to emit an audible signal (or buzz) to the rider if circuitry within the electric vehicle detects an error. For example, the buzzer mechanism may emit an error signal to the rider if circuitry within the electric vehicle does not pass a diagnostic test.

B. Illustrative Rider Detection Device and System

As shown in FIGS. 5-9, this section describes an illustrative rider detection system 400 having one or more strain gauges. Rider detection system 400 is (or includes) an example of rider detection device 262, described above.

Figure 5:
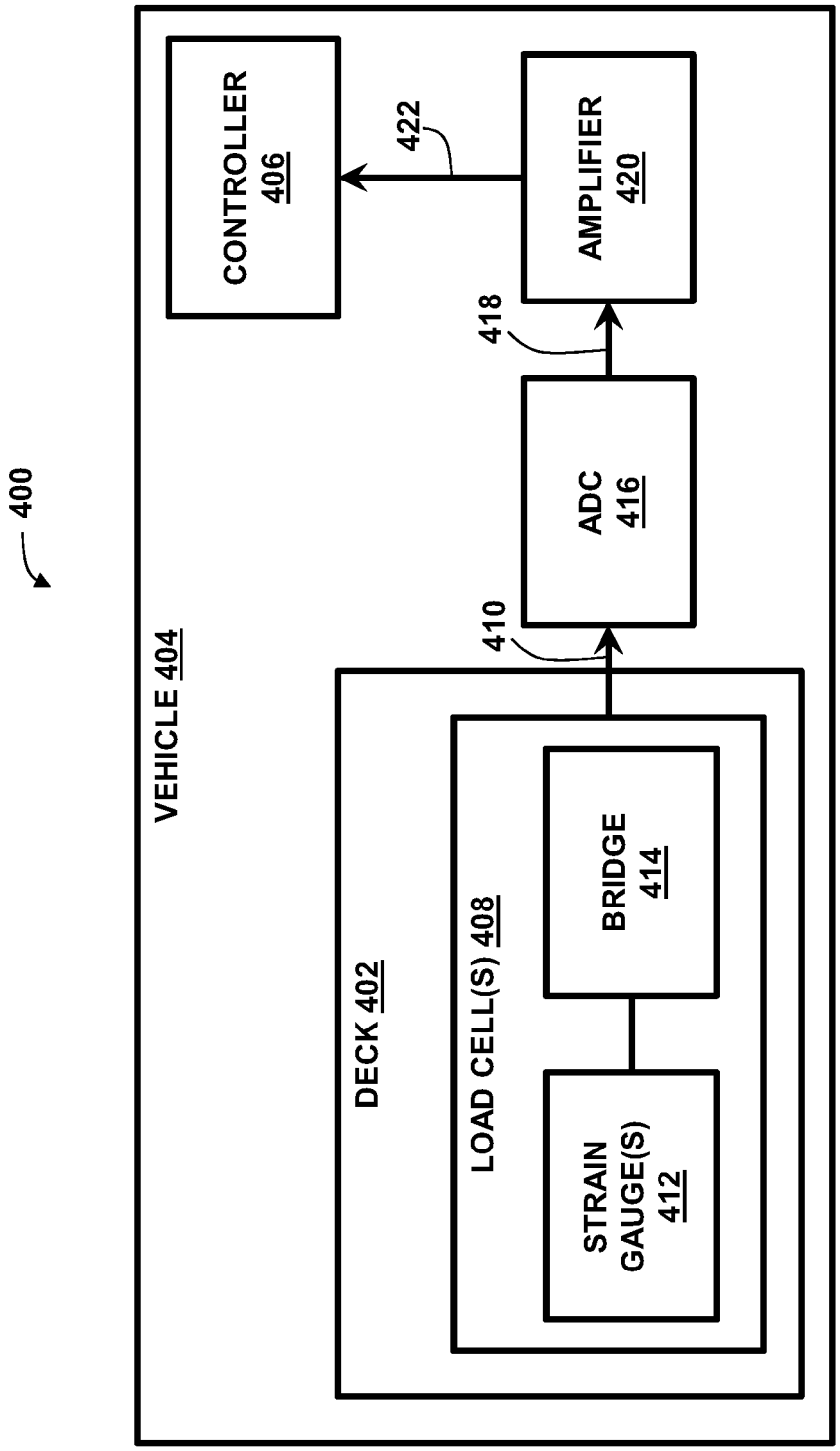
FIG. 5 is a schematic diagram of a rider detection system having one or more strain gauge load cells in accordance with the present teachings.

FIG. 5 is a schematic block diagram illustrating various components of rider detection system 400 mounted or otherwise coupled to a deck 402 of an illustrative vehicle 404. Vehicle 404 may include any suitable vehicle incorporating rider detection, such as vehicles 10 and/or 100 described above. In other words, vehicle 404 may be a self-balancing electric skateboard, substantially similar to vehicles 10 and/or 100. As such, vehicle 404 may include corresponding electrical systems, such as a controller 406, substantially similar to motor controller 254 and/or microcontroller 269. Rider detection system 400 provides one or more inputs to controller 406, as indicated in FIG. 5.

Rider detection system 400 comprises a load cell 408, which may be coupled to deck 402, and which provides an analog signal 410 proportional or otherwise corresponding to a strain (ε) sensed by the load cell. Load cell 408 may include any suitable load cell configured to sense mechanical strain and convert the sensed strain to an electrical signal. In this example, load cell 408 is a strain gauge load cell, including one or more strain gauges 412 electrically coupled to a bridge 414. In some examples, system 400 may include a plurality of strain gauges 412 and/or load cells 408 arranged in a selected configuration on deck 402. For example, load cell 408 may include two strain gauges 412 arranged as a quarter-bridge strain gauge load cell. In another example, load cell 408 may include four strain gauges 412 arranged as a full-bridge strain gauge circuit.

Analog signal 410 may be provided to an analog-to-digital converter (ADC) 416, which converts the signal to a digital signal 418. Digital signal 418 may then be amplified by an amplifier circuit 420 to increase the signal to a usable level for the controller. Amplifier circuit 420 may include any suitable amplifier, such as an instrumentation amplifier. An amplified digital signal 422 may then be supplied to controller 406.

In general, when a user steps onto deck 402, the deck will deform to a degree that is variable with the amount of force applied by the user's weight, balance, foot placement, orientation, and/or the like, or a combination of these. This deformation will be sensed by the strain gauge(s), resulting in a signal to the controller indicating that a user has mounted the vehicle. During operation, this information may be utilized by the controller to determine the rider's presence. Use of additional strain gauges and/or strain gauge load cells may improve accuracy and/or provide additional information, such as differential loading across the length and/or width of the deck.

In some examples, rider detection system 400 may include only one load cell 408 and/or only one strain gauge 412. In some examples, rider detection system 400 may simultaneously include additional non-strain-gauge methods of rider detection, as described above with respect to rider detection device 262.

Figure 6:
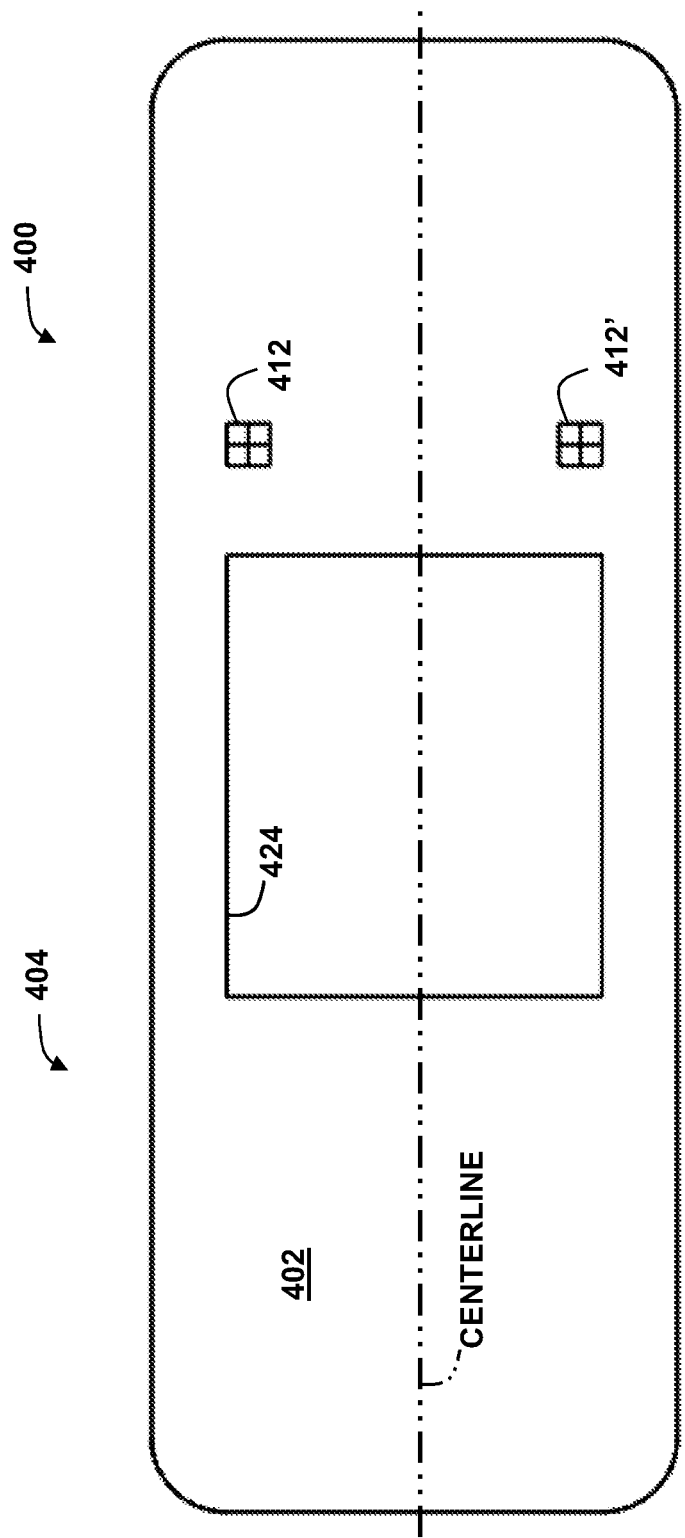
FIG. 6 is an overhead plan view of an illustrative vehicle having a rider detection system in accordance with aspects of the present disclosure.
Figure 7:
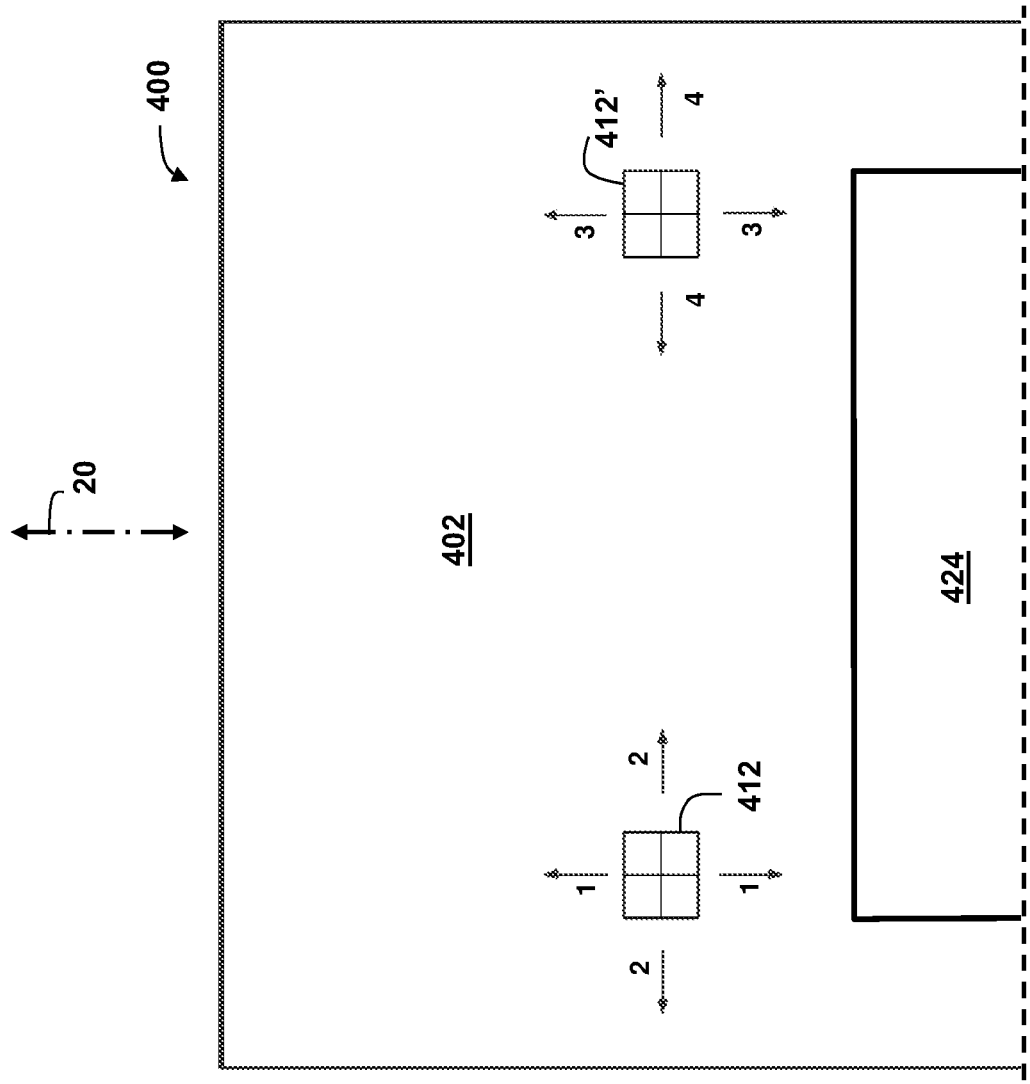
FIG. 7 is a partial overhead plan view of the vehicle of FIG. 6.
Figure 8:
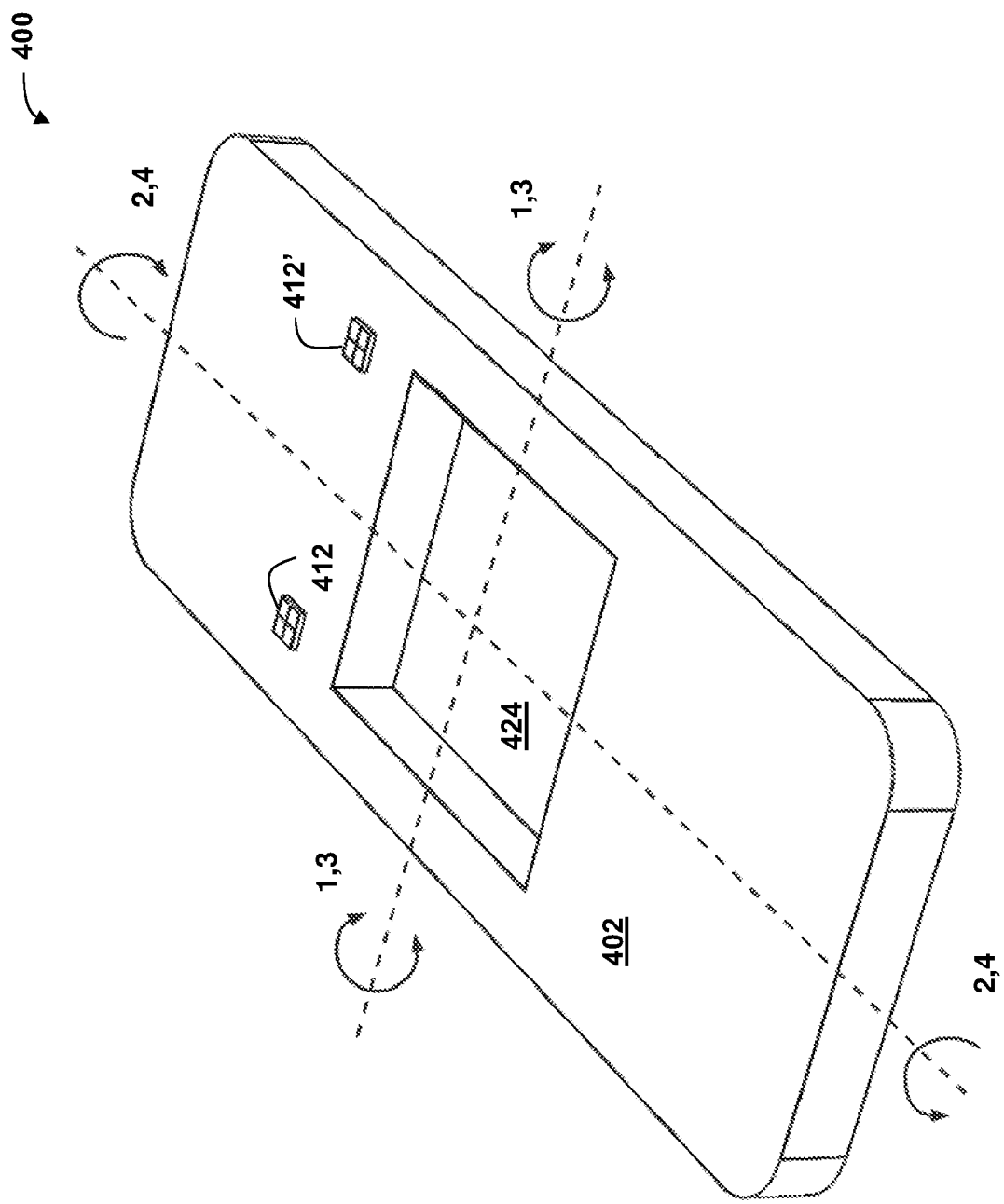
FIG. 8 is an oblique isometric view of the vehicle of FIG. 6.

FIGS. 6-8 illustrate an example of system 400 having two strain gauges: first strain gauge 412 and second strain gauge 412', disposed on deck 402. The strain gauges are spaced apart symmetrically across a width of the deck, on either side of centerline. The strain gauges are adjacent a central wheel assembly opening 424 (similar to opening 108 for the wheel assembly of vehicle 100), e.g., to take advantage of higher bending moments in that region, although other placements may be suitable (see FIG. 9). In this example, the deck is represented by a single monolithic plate. In other examples, such as vehicle 10, a frame and one or more deck portions may be fixed together to form the overall structure. Strain gauges 412 and 412' may be mounted to an underside of the deck, adjacent or otherwise relatively near other electronic and electrical devices of vehicle 404. This may reduce the length of wire runs, consolidate the electronic devices' footprint, etc. Coupling of the strain gauges to the deck may be performed using any suitable attachment method configured to permit the strain gauges to accurately sense strain on the deck, such as bonding, adhering, and/or the like.

As indicated in FIG. 7, strain gauge 412 may sense strain along a length dimension, indicated at $\epsilon(1)$ and a width dimension, indicated at $\epsilon(2)$. Similarly, strain gauge 412' may sense strain along a length dimension $\epsilon(3)$ and a width dimension, indicated at $\epsilon(4)$. Strain gauges 412 and 412' may be substantially equidistant from a central fulcrum of the vehicle (e.g., from the axle of the wheel assembly). As indicated in the isometric view of FIG. 8, this arrangement facilitates determination of twisting or bending of the deck with respect to a long axis, as indicated at $\epsilon(2,4)$ and with respect to a fulcral axis, as indicated at $\epsilon(1,3)$.

Figure 9:
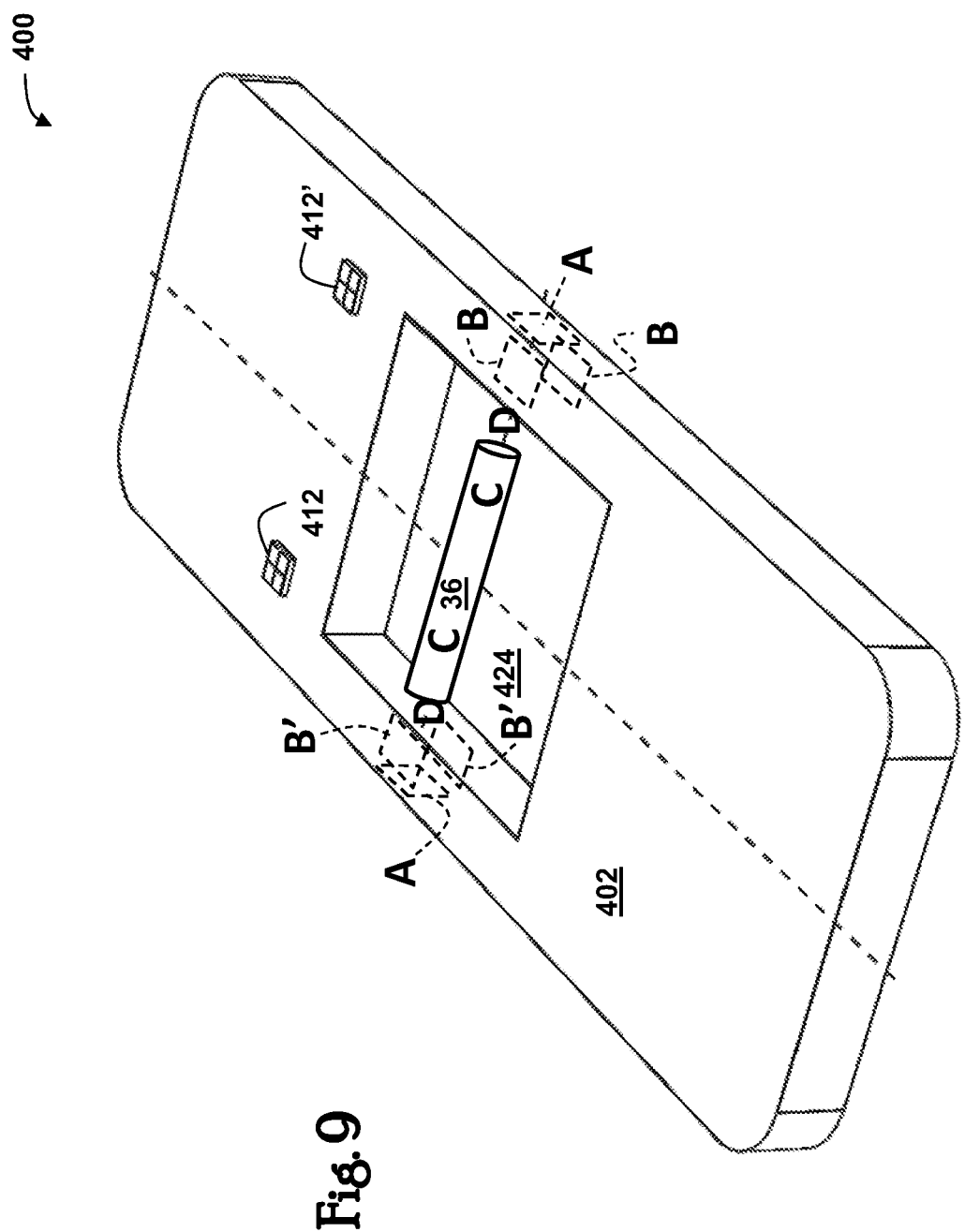
FIG. 9 is a view of the vehicle of FIGS. 6-8 showing additional and/or alternative locations for strain gauge placement.

Turning now to FIG. 9, various alternate or additional strain gauge placements are identified. As shown in FIG. 9, various locations may be suitable as alternatives or additions to the placement of strain gauges 412 and 412', discussed above. In some examples, strain gauge pairs may be disposed on opposing vertical side surfaces of deck 402, as indicated at A-A. In some examples, strain gauge pairs may be disposed on opposing horizontal surfaces of side rails of deck 402, as indicated at B-B or B'-B'. In some examples, strain gauge pairs may be disposed on shaft or axle 36, as indicated at C-C. In some examples, strain gauge pairs may be disposed on surfaces of axle supports 40 (not shown in FIG. 9), as indicated at D-D. One or more combinations of these and/or other locations may be suitable. In some examples, one or more of the strain gauges may be interchangeably replaced by a load cell 408. Although two strain gauges are described above, more or fewer strain gauges and/or load cells may be utilized.

In addition to a binary (e.g., yes/no) determination of rider presence, this dimensional and directional information relating to strain may be further utilized by control logic associated with the controller. For example, analysis of the sensed strain at the two strain gauges can determine foot placement, foot orientation, whether a rider's toe and/or heel is pressed against the board, how many feet are present on the board (e.g., one or two), and/or the like, or any combination of these. In some examples, a rider may signal his or her intention by changing foot placement, e.g., by raising a toe or a heel. Such a signal may trigger a predetermined set of events, such as motor shut down. See, e.g., FIG. 10. In some examples, sensed twisting of the board may be used to control vehicle speed and/or responsiveness, e.g., to enhance the riding experience and/or facilitate more intuitive control by the user.

In some examples, strain gauges 412 and 412' may be utilized to determine a weight of the rider. Rider weight information may be used to tailor or customize the ride characteristics of vehicle 404, e.g., automatically. For example, acceleration and power parameters may be adjusted based on the weight of the rider. A smaller and lighter rider will need less aggressive motor response (e.g., less of an applied voltage or motor torque increase in response to the same board tilt) than a larger and heavier rider to achieve the same riding experience. For example, tilting the deck forward by a selected amount may indicate that the rider wishes to accelerate forward at an expected rate. Moving riders of different weights at that same expected rate would require different motor responses. In some examples, aggressiveness of the PID controls may be automatically adjusted based on weight information. Alternatively or additionally, a weight-responsive IR compensation circuit may be used for this purpose. IR compensation is a speed regulation method wherein the motor controller attempts to maintain a constant vehicle speed despite changes in motor loading. The response of this method may be adjustable, e.g., by way of a compensation factor that adjusts how aggressively the controller tries to maintain constant speed under changing load conditions. Other speed regulation methods incorporating rider weight information may be suitable. Accordingly, weight-related information obtained from the strain gauges may be utilized to ensure an expected riding experience from rider to rider. In some examples, rider weight may be categorized, e.g., into predetermined ranges or categories (e.g., low, medium, high), with correspondingly discrete aggressiveness settings. In some examples, motor controller characteristics may be continuously variable based on actual sensed weight. In some examples, motor controller aggressiveness characteristics may have different variability within different categories.

C. First Illustrative Method

Figure 10:
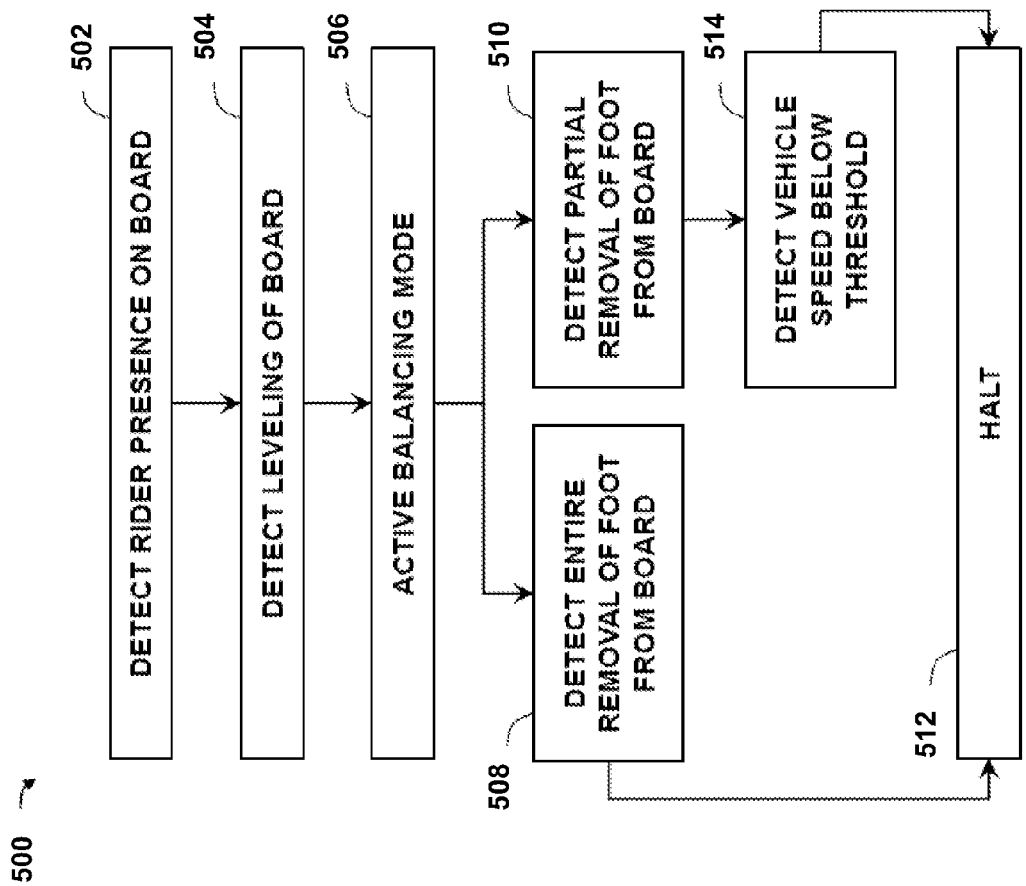
FIG. 10 is a flow chart showing steps of an illustrative method for using a rider detection system in accordance with aspects of the present disclosure.

This section describes an illustrative method for operating an electric vehicle such as vehicle 100 having a rider detection system such as system 400; see FIG. 10. Aspects of rider detection devices and systems described above may be utilized in the method steps described below. Where appropriate, reference may be made to previously described components and systems that may be used in carrying out each step. These references are for illustration, and are not intended to limit the possible ways of carrying out any particular step of the method.

FIG. 10 is a flowchart illustrating steps performed in an illustrative method, and may not recite the complete process or all steps of the process. FIG. 10 depicts multiple steps of a method, generally indicated at 500, which may be performed in conjunction with vehicles having rider detection systems according to aspects of the present disclosure. Although various steps of method 500 are described below and depicted in FIG. 10, the steps need not necessarily all be performed, and in some cases may be performed in a different order than the order shown. Additionally, steps of method 500 may be combined with one or more method steps described herein.

At step 502, the control system of an electric vehicle (e.g., vehicle 404), which may include a processor and/or controller (e.g., controller 406), detects the presence of a rider on the electric vehicle. For simplicity, the electric vehicle will be referred to as a board. Any suitable vehicle may be used, such as vehicle 100 described above. Detection of the rider may be performed in any suitable manner. For example, the rider may be detected using one or strain gauges, such as strain gauges 412, 412'. As explained above, the strain gauges and/or load cells may be arranged and configured such that changes in pressure associated with a front or toe portion of the foot may be differentiated from those associated with a rear or heel portion of the foot. In this example, detection of rider presence does not change the status of an active balancing system on the vehicle.

At step 504, the control system detects that the board has been substantially leveled. In other words, a tilt angle of the board has reached a state or range that is defined as "level" or "no longer at rest" by the system. For example, a rider may place both feet on the board and cause the foot deck to become generally parallel to the ground. Detection of board angle may be performed by any suitable method using any suitable sensor and/or detector, as described above with respect to FIGS. 1-3.

At step 506, when the control system is satisfied that the rider is present and the board is in a level position, active balancing may be engaged.

At steps 508 and 510, the system may detect a change in rider presence, and respond accordingly. At step 508, the system may detect that the entire foot of the rider has been removed from the board. For example, the strain gauge(s) may no longer sense the applied strain associated with a rider's feet. In this case, the system may assume that the rider is no longer on the vehicle, and may halt the vehicle motor at step 512, either immediately or after some selected delay. At step 510, on the other hand, the system may detect that only a portion of the rider's foot has been removed from the board. For example, analysis of a differential between the strain gauges may indicate that only the toe or only the heel is raised. This may occur, for example, during a turn when a ride lifts his or her toes (or heels) to maintain balance. In another example, a rider may indicate a desire to halt motor operation by raising a heel or a toe of one foot. In response to a partial loss of rider detection, step 514 includes checking the vehicle speed. If vehicle speed is above a selected threshold, the board will continue operating in active mode. If vehicle speed is below the threshold (e.g., three miles per hour), the system may halt vehicle operation at step 512.

D. Second Illustrative Method

Figure 11:
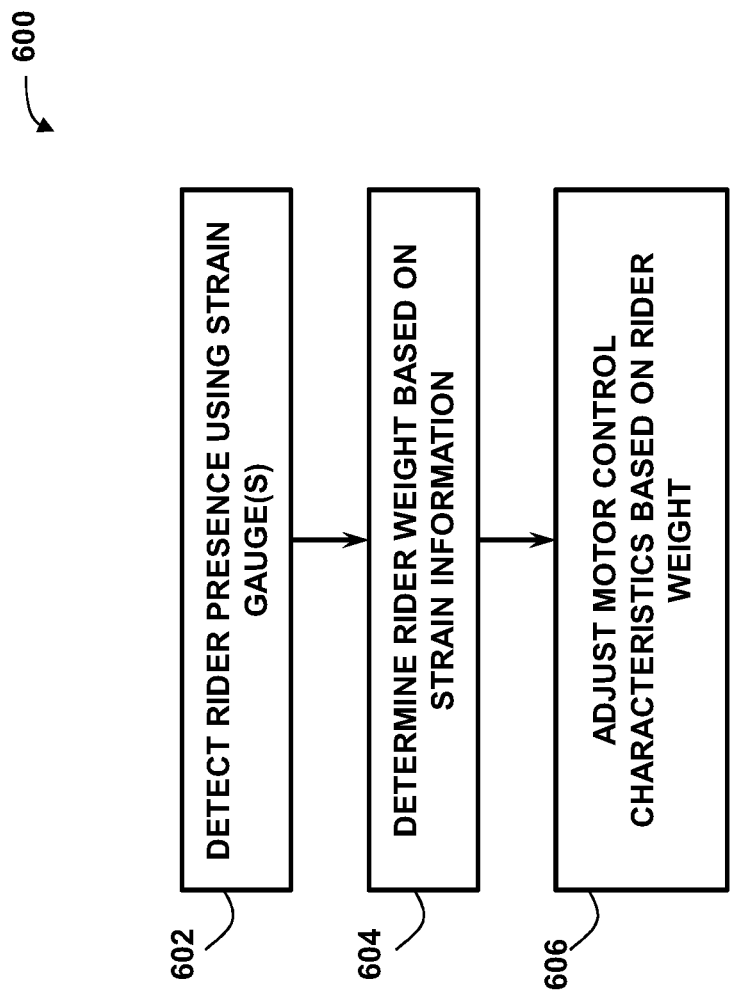
FIG. 11 is a flow chart showing steps of an illustrative method for adjusting vehicle operating characteristics based on a sensed weight of a rider, according to the present teachings.

This section describes steps of an illustrative method for adjusting motor control characteristics and/or parameters in an electric self-balancing vehicle such as vehicle 10 or 100; see FIG. 11. Aspects of rider detection devices and systems described above may be utilized in the method steps described below. Where appropriate, reference may be made to previously described components and systems that may be used in carrying out each step. These references are for illustration, and are not intended to limit the possible ways of carrying out any particular step of the method.

FIG. 11 is a flowchart illustrating steps performed in an illustrative method, and may not recite the complete process or all steps of the method. FIG. 11 depicts multiple steps of a method, generally indicated at 600, which may be performed in conjunction with vehicles having rider detection systems according to aspects of the present disclosure. Although various steps of method 600 are described below and depicted in FIG. 11, the steps need not necessarily all be performed, and in some cases may be performed in a different order than the order shown.

At step 602, the presence of a rider on the vehicle is detected using one or more strain gauges, such as strain gauges 412, 412'. Strain on the strain gauge(s) and/or load cells above a selected threshold indicates that a rider has mounted the vehicle. In some examples, such as a one-wheeled vehicle with a deck (e.g., vehicle 404), a rider typically straddles the central axle, causing the deck to flex slightly about the fulcrum formed by the axle. Detection of this strain pattern, alone or in combination with the threshold method, may indicate the presence of a rider.

At step 604, a weight of the rider may be determined based on the sensed strain at the strain gauge(s). Household scales typically use one or more similar strain gauges. Accordingly, the weight of the rider may be determined based on known methods. Additionally, or alternatively, strain may be compared to one or more known target or milestone values to categorize the weight of the rider. Because a rider may bounce or otherwise cause sensed stress to fluctuate, weight may be averaged, filtered, or otherwise determined over time.

At step 606, a motor controller or the like (e.g., controller 406) may be adjusted in response to the weight or weight category determined in step 608. For example, aggressiveness of acceleration and/or motor power may be increased for a rider having a higher weight, and reduced for a rider having a lower weight, e.g., using weight-responsive PID and/or IR compensation methods. Such characteristics may be in relation to other inputs, such as board angle, such that the acceleration and/or motor power, or the like, are adjusted as a ratio or degree of responsiveness. For example, adjustment may be made such that similar board angles result in different acceleration responses, depending on the rider's weight. Such relationships may be proportional, nonlinear, or based on a selected formula or predetermined response curve. In some examples, the responsiveness level may be selected automatically. In some examples, the rider may select different overall responsiveness characteristics, e.g., from a menu of such choices. Weight-related tailoring may be performed in addition to or in combination with such a manual category choice.

E. Additional Examples and Illustrative Combinations

This section describes additional aspects and features of electric vehicles having strain gauge-based rider detection systems, and related methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. An electric vehicle comprising:

a board including first and second deck portions each configured to receive a left or right foot of a rider oriented generally perpendicular to a longitudinal centerline of the board;

a wheel assembly including a ground-contacting element disposed between and extending above the first and second deck portions;

a motor assembly mounted to the board and configured to rotate the ground-contacting element around an axle to propel the electric vehicle;

at least one orientation sensor configured to measure orientation information of the board;

a first strain gauge and a second strain gauge spaced apart across the longitudinal centerline of the board and configured to produce rider presence information and rider weight information; and a motor controller in communication with the motor assembly, the motor controller configured to receive the orientation information and the rider presence information, and to cause the motor assembly to propel the electric vehicle based on the board orientation information and the rider presence information;

wherein the motor controller is configured to respond to the orientation information with a selected aggressiveness based on the rider weight information.

A1. The electric vehicle of A0, wherein the selected aggressiveness of the motor controller response is selectable by the user.

A2. The electric vehicle of A0, wherein the selected aggressiveness of the motor controller is determined automatically, based on a weight category of the user.

A3. The electric vehicle of A0, wherein the selected aggressiveness of the motor controller is associated with a Proportional-Integral-Derivative (PID) loop.

A4. The electric vehicle of A0, wherein the selected aggressiveness of the motor controller is associated with an IR compensation circuit.

A5. The electric vehicle of A0, wherein the ground contacting element extends laterally across at least a majority of a width of the board.

A6. The electric vehicle of A0, wherein the first and second deck portions are formed as a single piece.

A7. The electric vehicle of A0, wherein the first and second strain gauges are each disposed on the second deck portion.

A8. The electric vehicle of A0, wherein the first and second strain gauges each comprise a respective full-bridge strain gauge circuit.

B0. A self-balancing electric vehicle comprising:

a board having a first deck portion and a second deck portion, collectively defining a plane and having a longitudinal axis, the first deck portion configured to support a first foot of a rider oriented generally perpendicular to the longitudinal axis, the second deck portion configured to support a second foot of the rider oriented generally perpendicular to the longitudinal axis;

a wheel mounted to the board between the deck portions, extending above and below the plane and configured to rotate about an axle coupled to the board;

an orientation sensor coupled to the board and configured to sense orientation information of the board;

a first strain gauge load cell and a second strain gauge load cell spaced apart across the longitudinal axis of the board, such that the first and second strain gauge load cells sense a strain applied to the board and are configured to produce rider presence information and rider weight information based on the sensed strain;

a motor controller configured to receive the orientation information and the rider presence information, and to generate a motor control signal in response; and a motor configured to receive the motor control signal from the motor controller and to rotate the wheel in response, thereby propelling the electric vehicle;

wherein the motor controller is further configured to adjust the motor control signal based on the rider weight information.

B1. The electric vehicle of B0, wherein the first strain gauge load cell comprises a full-bridge strain gauge circuit.

B2. The electric vehicle of B0, wherein the first strain gauge load cell and the second strain gauge load cell are disposed on the second deck portion.

B3. The electric vehicle of B0, wherein the first deck portion is coupled to the second deck portion by a rigid frame.

B4. The electric vehicle of B3, wherein the rigid frame, the first deck portion, and the second deck portion are formed as a single piece.

B5. The electric vehicle of B0, wherein the wheel extends laterally across at least a majority of a width of the board.

C0. An electric skateboard comprising:

a foot deck having first and second deck portions each configured to support a rider's foot oriented generally perpendicular to a longitudinal axis of the foot deck;

exactly one ground-contacting wheel disposed between and extending above the first and second deck portions and configured to rotate about an axle to propel the electric skateboard;

at least one orientation sensor configured to measure an orientation of the foot deck;

a first strain gauge load cell and a second strain gauge load cell spaced apart across the longitudinal axis of the foot deck, such that the first and second strain gauge load cells sense a strain applied to the foot deck and are configured to produce rider presence information and rider weight information based on the sensed strain; and an electric motor configured to cause rotation of the ground contacting wheel based on the orientation of the foot deck and the rider presence information;

wherein the electric motor is further configured such that a responsiveness characteristic is automatically adjusted based on the rider weight information.

C1. The electric skateboard of C0, wherein the first strain gauge load cell comprises a full-bridge strain gauge circuit.

C2. The electric skateboard of C0, wherein the foot deck is formed as a single piece.

C3. The electric skateboard of C0, wherein the responsiveness characteristic corresponds to a change in a voltage applied to the electric motor for a given change in the orientation of the foot deck.

C4. The electric skateboard of C3, wherein the responsiveness characteristic is proportional to the rider weight information.

C5. The electric skateboard of C0, wherein the ground-contacting wheel extends laterally across at least a majority of a width of the foot deck.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An electric vehicle comprising:
a board including first and second deck portions each configured to receive a left or right foot of a rider oriented generally perpendicular to a longitudinal centerline of the board;
a wheel assembly including a ground-contacting element disposed between and extending above the first and second deck portions;
a motor assembly mounted to the board and configured to rotate the ground-contacting element around an axle to propel the electric vehicle;
at least one orientation sensor configured to measure orientation information of the board;
a first strain gauge and a second strain gauge spaced apart across the longitudinal centerline of the board and configured to produce rider presence information and rider weight information; and
a motor controller in communication with the motor assembly, the motor controller configured to receive the orientation information and the rider presence information, and to cause the motor assembly to propel the electric vehicle based on the board orientation information and the rider presence information;
wherein the motor controller is configured to determine a weight category of the rider based on the rider weight information, and to respond automatically to the orientation information with a selected aggressiveness based on the rider weight category, such that a same board orientation results in a different acceleration response depending on the rider weight category.

2. The electric vehicle of claim 1, wherein the selected aggressiveness of the motor controller response is selectable by the user.

3. The electric vehicle of claim 1, wherein the selected aggressiveness of the motor controller is associated with a Proportional-Integral-Derivative (PID) loop.

4. The electric vehicle of claim 1, wherein the selected aggressiveness of the motor controller is associated with a current-resistance (IR) compensation circuit.

5. The electric vehicle of claim 1, wherein the ground contacting element extends laterally across at least a majority of a width of the board.

6. The electric vehicle of claim 1, wherein the first and second deck portions are formed as a single piece.

7. The electric vehicle of claim 1, wherein the first and second strain gauges are each disposed on the second deck portion.

8. The electric vehicle of claim 1, wherein the first and second strain gauges each comprise a respective full-bridge strain gauge circuit.

9. A self-balancing electric vehicle comprising:
a board having a first deck portion and a second deck portion, collectively defining a plane and having a longitudinal axis, the first deck portion configured to support a first foot of a rider oriented generally perpendicular to the longitudinal axis, the second deck portion configured to support a second foot of the rider oriented generally perpendicular to the longitudinal axis;
a wheel mounted to the board between the deck portions, extending above and below the plane and configured to rotate about an axle coupled to the board;
an orientation sensor coupled to the board and configured to sense orientation information of the board;
a first strain gauge load cell and a second strain gauge load cell spaced apart across the longitudinal axis of the board, such that the first and second strain gauge load cells sense a strain applied to the board and are configured to produce rider presence information and rider weight information based on the sensed strain;
a motor controller configured to receive the orientation information and the rider presence information, and to generate a motor control signal in response; and
a motor configured to receive the motor control signal from the motor controller and to rotate the wheel in response, thereby propelling the electric vehicle;
wherein the motor controller is further configured to determine a weight category of the rider based on the rider weight information, and to adjust the motor control signal based on the weight category, such that a same board orientation results in a different acceleration response depending on the rider weight category.

10. The electric vehicle of claim 9, wherein the first strain gauge load cell comprises a full-bridge strain gauge circuit.

11. The electric vehicle of claim 9, wherein the first strain gauge load cell and the second strain gauge load cell are disposed on the second deck portion.

12. The electric vehicle of claim 9, wherein the first deck portion is coupled to the second deck portion by a rigid frame.

13. The electric vehicle of claim 12, wherein the rigid frame, the first deck portion, and the second deck portion are formed as a single piece.

14. The electric vehicle of claim 9, wherein the wheel extends laterally across at least a majority of a width of the board.

15. An electric skateboard comprising:
a foot deck having first and second deck portions each configured to support a rider's foot oriented generally perpendicular to a longitudinal axis of the foot deck;
exactly one ground-contacting wheel disposed between and extending above the first and second deck portions and configured to rotate about an axle to propel the electric skateboard;
at least one orientation sensor configured to measure an orientation of the foot deck;
a first strain gauge load cell and a second strain gauge load cell spaced apart across the longitudinal axis of the foot deck, such that the first and second strain gauge load cells sense a strain applied to the foot deck and are configured to produce rider presence information and rider weight information based on the sensed strain; and
an electric motor configured to cause rotation of the ground contacting wheel based on the orientation of the foot deck and the rider presence information;
wherein the electric motor is further configured to determine a weight category of the rider based on the rider weight information, and to adjust a responsiveness characteristic based on the weight category, such that a same foot deck orientation results in a different acceleration response depending on the rider weight category.

16. The electric skateboard of claim 15, wherein the first strain gauge load cell comprises a full-bridge strain gauge circuit.

17. The electric skateboard of claim 15, wherein the foot deck is formed as a single piece.

18. The electric skateboard of claim 15, wherein the responsiveness characteristic corresponds to a change in a voltage applied to the electric motor for a given change in the orientation of the foot deck.

19. The electric skateboard of claim 18, wherein the responsiveness characteristic is proportional to the rider weight information.

20. The electric vehicle of claim 1, wherein the motor controller is configured to respond to different rider weight categories with different respective acceleration response curves.

* * * * *

UNITED STATES PATENT AND TRADEMARK OFFICE
CERTIFICATE OF CORRECTION

PATENT NO. : 9,908,580 B2
APPLICATION NO. : 15/612321
DATED : March 6, 2018
INVENTOR(S) : Kyle Jonathan Doerksen and Daniel Wood Page 1 of 1

It is certified that error appears in the above-identified patent and that said Letters Patent is hereby corrected as shown below:

In the Specification

At Column 15, Paragraph 3, Line 3: delete "608", insert --604--

Signed and Sealed this
Thirty-first Day of July, 2018

Andrei Iancu
*Director of the United States Patent and Trademark Office*